US006476702B1

(12) United States Patent
Hartwig et al.

(10) Patent No.: US 6,476,702 B1
(45) Date of Patent: Nov. 5, 2002

(54) ELECTROMAGNETIC ACTUATOR WITH AN OSCILLATING SPRING-MASS SYSTEM

(75) Inventors: Christoph Hartwig, Hannover (DE); Stefan Preussler, Neustadt (DE); Maik Hofmann, Bad Münder (DE); Hans-Jürgen Karkosch, Hemmingen (DE)

(73) Assignee: Contitech Vibration Control GmbH, Hannover (DE)

( * ) Notice: Subject to any disclaimer, the term of this patent is extended or adjusted under 35 U.S.C. 154(b) by 0 days.

(21) Appl. No.: 09/784,449

(22) PCT Filed: Jul. 5, 1999

(86) PCT No.: PCT/EP99/04662

§ 371 (c)(1),
(2), (4) Date: Mar. 29, 2001

(87) PCT Pub. No.: WO00/13297

PCT Pub. Date: Mar. 9, 2000

(30) Foreign Application Priority Data

Aug. 29, 1998 (DE) .......................................... 198 39 464

(51) Int. Cl.[7] ................................................. H01F 7/08
(52) U.S. Cl. ...................................... 335/220; 335/229
(58) Field of Search ................................. 335/220–229, 335/231, 234, 235, 256, 266–268; 251/129.01–129.15

(56) References Cited

U.S. PATENT DOCUMENTS 5,365,210 A * 11/1994 Hines .......................... 335/238
5,427,362 A    6/1995 Schilling et al.
5,920,247 A * 7/1999 Pischinger et al. .......... 335/229

FOREIGN PATENT DOCUMENTS

DE     4301845      3/1994
JP    56122107      9/1981

OTHER PUBLICATIONS

Article "Permanent Magnet Linear Motors for Short Strokes" by Lequesne et al., IEEE Industry Applications Society Annual Meeting, Bd. 1 1992, pp. 162–170, XP000368800 New York is listed; (no date).
Patent Abstract of Japan JP 56 122107 (no date).
Article "Modeling and Analysis of a new Linear Actuator" by Carlson et al.,IEEE Industry Applications Conference, BD. Conf. 30, 8.–12. Oct. 1995, pp. 464–468, XP000550977 Orlando, US (no date).

* cited by examiner

*Primary Examiner*—Lincoln Donovan
(74) *Attorney, Agent, or Firm*—Greenblum & Bernstein, P.L.C.

(57) ABSTRACT

Actuator including a ferromagnetic jacket and at least one magnet embedded in the jacket including a length, a first end, and a second end. Each of the first and second ends of the magnet include a surface which is at least partially covered by the jacket. A ferromagnetic core comprises a length, a first collar-like protrusion, and a second collar-like protrusion. An electrically conductive coil through which an electrical current may flow is mounted to the core. The coil comprises a length. The coil is arranged adjacent the magnet and separated from the magnet by a gap. The length of the magnet is greater than the length of the coil. At least one of the coil and the magnet is movably mounted. At least one of the coil and the magnet is statically mounted. One of the coil and the magnet is capable of vibrating while the other of the coil and the magnet remains static.

44 Claims, 8 Drawing Sheets

ELECTROMAGNETIC ACTUATOR WITH AN OSCILLATING SPRING-MASS SYSTEM

BACKGROUND OF THE INVENTION

1. Field of the Invention

The invention relates to an actuator that contains the following components; at least one magnet with a predetermined direction of magnetization, an electrically conductive coil with a longitudinal axis that is oriented in an essentially vertical position with respect to the direction of magnetization of the magnet and which can be operated by an electric current, with the coil being arranged in an offset position near the magnet in the direction of the magnetization of the magnet so that an air gap remains between the coil and the magnet and, viewed in a longitudinal direction of the coil, the magnet protrudes beyond the ends of the coil during a static state of the actuator, a ferromagnetic core of high permeability around which the coil is wound and which, viewed in the longitudinal direction of the coil, ends above and below the coil in collar-shaped projections made of a highly permeable ferromagnetic material.

Actuators of the type mentioned at the outset contain a spring-mass system able to oscillate that is initiated to oscillate when an alternating current is driven through the electrically conductive coil. The actuators are used for very diverse purposes, for instance, as linear motors in pumps, as oscillations generators, or as oscillation eliminators. In the latter case, an actuator of the type mentioned at the outset is connected in its mechanical effect to an oscillating component and oscillations are created in the actuator which are superimposed on the oscillations of the component. By a suitable choice of amplitude, frequency, and phase of the oscillations created by the actuator, the oscillations of the component are reduced or eliminated.

2. Discussion of Background Information

An actuator is known from DE 43 01 845 C1 that is used as the active oscillation eliminator for a machine component moving back and forth. The active oscillation eliminator contains a support plate, mounted to the machine component, on which an electrically conductive insertion coil is positioned stationarily. The insertion coil is concentrically enclosed radially inside and radially outside by a pot magnet. With the aid of spring elements, the pot magnet is connected in a springed manner to the support plate of the active oscillation eliminator and is guided by a guiding device arranged parallel to the axis of the insertion coil. When an alternating current is driven through the electrically conductive insertion coil, the pot magnet begins to oscillate. The oscillations of the pot magnet are superimposed onto the oscillations of the machine component such that a reduction or elimination of these oscillations results.

The active oscillation eliminator known from DE 43 01 845 C1 has a relatively simple design and an extensively linear operational behavior due to a consistent gap width of the air gap that is ensured by the guidance device of the pot magnet. However, it is discernible that the elimination force created by the pot magnet is relatively small in relation to its constructive size since, in the active oscillation eliminator, only relatively small periodic exciter forces can be created and the elimination force is proportional to the amplitude of the exciter force. In the oscillation eliminator, only an electrodynamic force, which develops from the electric current flowing through the insertion coil between the insertion coil and the pot magnet, acts as the exciter force. Since the elimination force created in an oscillation eliminator is also proportional to the size of the oscillating mass, this problem could be solved basically by an enlargement of the pot magnet. However, not all applications of the active oscillation eliminator provide a sufficiently large constructive space. Basically, the problem could also be solved by choosing the natural frequency of the oscillating mass-spring system to be the same as the one to be eliminated since, in this case, the amplitude of the inertial mass results in very high values at an accordingly small dampening. The smaller the dampening, however, the smaller also the bandwidth of the desired resonance superposition so that only in a small range of frequencies can large elimination forces be achieved. In summary, it can be seen that, with the aid of the active oscillation eliminators known from DE 43 01 845 C1 in the given construction volume of the oscillating system (i.e., in a predetermined mass of the pot magnet), only relatively smaller elimination forces can be created. Thus, only relatively small forces can be eliminated.

From the paper "Modeling and Analysis of a new Linear Actuator" by Renato Carlson, Nelson Sadowski, Alberto M. Beckert, Nelson J. Batistela (published at the Industry Application Conference 1995, 30th IAS Meeting IAS' 95, Conference Record of the 1995 IEEE, Oct. 8–12 1995, Orlando, Fla.) a linear actuator of the above-mentioned type is known that is provided with two cuboid permanent magnets with an electrically conductive coil being provided, which is wound onto an iron core in the shape of a double T. The magnetization of the permanent magnets points to the electrically conductive coil that is positioned between the permanent magnets and the upper and lower surfaces of the permanent magnets, viewed in the longitudinal direction of the coil, are covered with iron. The two cuboid permanent magnets are then positioned between two cuboid iron blocks. Furthermore, the permanent magnets and the flux guiding pieces covering them at the upper and lower end, with the aid of coil springs mounted in a springed manner, the other components of the linear actuator, however, being mounted statically. When alternating current is guided through the electrically conductive coil, the permanent magnets mounted in a springed manner are excited into oscillations.

In the linear actuator according to the above-mentioned paper, large exterior exciter forces can be created since, in addition to the electrodynamic forces, magnetic reluctance forces additionally act between the parts of the actuator that are statically positioned and those positioned in a springed manner, with said forces all acting in the same direction and add to a great force summary. Thus, in the linear actuator according to the above-mentioned paper, relatively greater exciter forces can be created with relatively small constructive dimensions. However, it must be stated that the linear actuator known from the above-mentioned paper is provided with complicated design since it contains a multitude of parts that are separated from each other by air gaps.

SUMMARY OF THE INVENTION

The invention is based on developing an actuator having a simple design in which large excited forces can be created.

According to another embodiment, the invention provides for an actuator in which the magnet is embedded in a ferromagnetic jacket of high permeability that covers at least the surface of the magnet facing away from the coil and, viewed in the longitudinal direction of the coil, at least partially the upper and the lower surface of the magnet and in that either the embedded magnet is statically positioned and the coil, including the core, is positioned in a springed manner such that the coil, including the core, is able to perform oscillations in the longitudinal direction of the coil or the coil, including the core, is statically positioned and the embedded magnet is positioned in a springed manner such that it can perform oscillations in the longitudinal direction of the coil.

The components of the actuator that are positioned as being oscillating in a given case are made to oscillate when an alternating current flows through the coil of the actuator.

In addition to the uses mentioned at the outset, the actuator can be used to excite the masses in a motor vehicle positioned in a springed manner to oscillator for the purpose of superimposing these oscillations onto the distributing oscillations in the motor vehicle such that they are eliminated as much as possible. In this case, the force creating the oscillating mass of the actuator is used as the exciter force for another spring mass system. Since large exciter forces are created with the oscillating mass of the actuator according to the invention large masses can be excited to oscillate in the motor vehicle. For example, it is possible to position the battery of a motor vehicle in a springed manner and to excite it to oscillate with the aid of the actuator.

The advantages achieved with the invention can be seen in the simple design of the actuator since it contains only few components. In the simplest case, the actuator utilizes only two parts, namely of the coil wound around the core and the magnet, with one of the two components being positioned in a springed manner. In spite of this simple construction, large exciter forces can be created inside of the actuator since, in addition to the electrodynamic forces, magnetic reluctance forces acting parallel also act in the actuator when an alternating current flows through the electrically conductive coil (for details, see descriptive figures). Another advantage of the invention can be seen in the actuator having only one air gap between the magnet or the magnets and the electrically conductive coil. The number of air gaps is therefore reduced in reference to those known from the paper "Modeling an Analysis of a new Linear Actuator." Due to the lower number of air gaps, the actuator has only minor loss of magnetic flux so that the magnetic field created can be better utilized.

According to one embodiment of the invention, the actuator contains the following components: a ring-shaped magnet with a magnetization in a radial direction, an electrically conductive coil whose longitudinal axis is positioned in the radial direction of the magnetization and which is concentrically enclosed by the ring-shaped magnet such that an air gap remains between the magnet and the coil.

The advantage of this exemplary embodiment can be seen in the actuator having a rotationally symmetrical design in the longitudinal direction of the coil and only one ring-shaped air gap between the magnet and the coil so that the constructive volume of the actuator is used optimally. Additionally, all forces acting on the coil in the radial direction balance each other out and only a small minor loss of magnetic field occurs. Additionally, the actuator has a largely linear operational behavior in a corresponding positioning of the magnet or the coil wrapped around the core, since the width of the air gap between the ring magnet and the coil does not change. With regard to appropriately embodied bearings, reference is made to the descriptive figures.

According to another embodiment of the invention, the actuator contains the following components: two cuboid magnets largely separated from one another with faces whose surface normal points towards the positive or negative "y" direction, with the magnetization of the one magnet pointing towards the positive "y" direction and the magnetization of the other magnet pointing towards the negative "y" direction and with each magnet being embedded in a ferromagnetic jacket of high permeability which covers at least partially the facial surfaces of the magnets facing away from the coil and the surfaces of the magnet whose surface normals are pointed in the positive or negative "z" direction and an electrically conductive coil whose longitudinal axis is oriented in the "z" direction (or perpendicular to the y direction) and can be driven by an electric current with the coil being positioned between the magnets such that an air gap remains between the coil and each of the two magnets.

For describing this embodiment, a system of Cartesian coordinates was introduced in order to clarify the orientation of the separate components of the actuator. Here, it was assumed that the direction of the magnetization of the magnets are fixed in the "y" direction.

An advantage of this embodiment is to be seen in the magnets of the actuator being provided of a simple cuboid design and thus being easy to produce. Another advantage of the exemplary embodiment is to be seen in the actuator being provided with a design symmetrical to the "x-z" plane in which the longitudinal axis of the coil is positioned so that, in this exemplary embodiment, all forces acting in the "y" direction of the coil balance each other out as well when the two air gaps are provided with the same width between each of the magnets and the coil. Additionally, the actuator is provided with a largely linear operational behavior when the magnets or the coil wrapped around the core are positioned appropriately since the air gap between the magnet and the coil does not vary then. With regard to the positioning being embodied appropriately, reference is made to the descriptive figures here as well.

According to another embodiment, the coil of the actuator is short-circuited by a controllable electric consumer, in particular, by a controllable electric resistor. When a load is fixed to the components of the actuator positioned in a springed manner according to this improvement, the actuator acts as an active being with a variable dampening for this load. As soon a the load and thus the components of the actuator positioned in a springed manner are made to oscillate in the longitudinal direction of the coil by external influences, a voltage is induced in the coil due to the moving magnets and the magnetic field that permeates the coil, permanently changing its timing which leads to a flow of current in the coil. The electric energy is transformed into different forms of energy in the electric consumer through which the coil is short-circuited. Preferably, a controllable electric resistor is used as the electric consumer in which the electric energy is transformed into heat. The transformation of the oscillation energy of the load into different forms of energy, in particular heat, dampens the oscillations of the load. Here, the amount of the dampening can be adjusted by the controllable electric consumer. The dampening is the highest, for instance, when the electric resistance is increased. For instance, the motor of a motor vehicle can be considered as the load.

Preferably, the movable components of the actuator can be positioned via an elastomer bearing. Alternatively, other support springs, for instance, made of steel or another fiberglass-supported plastic, can be used.

The magnet or magnets can be positioned statically and the coil, including the core, can be positioned in a springed manner with the aid of coil springs whose longitudinal direction runs in the direction of the longitudinal axis of the coil. Preferably, the coil springs are positioned concentrically to the longitudinal axis of the coil.

The magnet or magnets are positioned statically and the coil, including the core, is positioned in a springed manner with the aid of leaf springs. The advantage of this improvement is to be seen in the leaf springs being flexible in one direction like coil springs, but, as opposed to coil springs they can absorb forces perpendicular to this direction without deforming to a large extent. The leaf springs are directed in the actuator such that the direction of the leaf springs, in which they can largely absorb the forces without deformation, span the air gap or air gaps (or such that their flexible direction runs in the direction of the longitudinal axis of the coil) so that it is ensured that the width of the air gap or air gaps remains largely constant during the operation of the actuator.

The invention also provides, viewed in the longitudinal direction of the coil, at least one leaf spring positioned above and below the core which is connected, on the one side, to the core in a mechanical connection and, on the other side, tightly clamped in a statical bearing. The longitudinal direction of the leaf springs is largely oriented perpendicularly to the longitudinal axis of the coil and can run in any direction, otherwise. However, the leaf springs are preferably oriented such that their longitudinal direction runs in the "x" direction. Such an arrangement of the leaf springs ensures that the width of the air gap between the coil and the magnets, between which the coil is positioned, remains constant during the entire oscillation process of the coil.

The invention further provides, viewed in the longitudinal direction of the coil, at least one leaf spring positioned above and below the coil in the central area, being in mechanical connection with the core, and clamped at both ends. The advantage of this improvement is to be seen in that no resulting torsion momentum is created during the operation of the actuator. Each leaf spring is clamped at its end in a movable bearing. In another exemplary embodiment each leaf spring is tightly clamped at its end and stretchable in its longitudinal direction.

The invention also contemplates, viewed in the longitudinal direction of the coil, one system of leaf springs provided each above and below the core, utilizing at least two leaf springs 26, 28 that are connected with each other in a mechanically effective connection, with at least one leaf spring 28 of each system of leaf springs being in mechanically effective connection with the core 10 and the other leaf spring 26 of each leaf spring system to the housing 24 of the actuator. Each of the leaf spring systems acts in the longitudinal direction of the coil like a coil spring; however, perpendicularly to this direction, it is largely stiff so that a constant width of the air gap is ensured during operation as well.

The advantage of this improvement is to be seen in the coil spring system having a simple design and creating no resulting torsion momentum during the operation of the actuator.

The invention also contemplates that both the leaf springs provided above and below the core are connected in an electrically conductive manner to, on the one side, the coil and, on the other side, the voltage source through which the current is created that is driven through the coil. The advantage of this improvement is in that the voltage source can be connected to the tightly clamped end of the leaf spring. In this case, the conductive connection of the voltage source to the leaf spring is not dynamically stressed even when the coil is made to oscillate. The conductive connection from the leaf spring to the coil is not dynamically stressed by the oscillations of the coil either, since the ends of the conductive connection do not move in relation to one another during an oscillation process.

At least one leaf spring is provided in an actuator above and below the core, viewed in the longitudinal direction of the coil, whose one end is in a mechanical connection with the first magnet and whose other end is in a mechanical connection with the second magnet and which are fixed in the central area.

The ferromagnetic core and the ferromagnetic jackets may utilize ferromagnetic sheet metal with high permeability that are separated from one another by insulating layers. The advantage of this improvement is to be seen inside of the ferromagnetic core and inside of the ferromagnetic jackets, no strong eddy currents can form when a magnetic flux fluctuating in its timing is guided through the ferromagnetic core and through the ferromagnetic jackets. The eddy currents are limited to the "thickness" of the sheet metal, however, and therefore accordingly are weak. The resistance loss inside the ferromagnetic sheet metal and the heat of the ferromagnetic sheet metal developing as a result can therefore be disregarded. Another advantage of this improvement is to be seen in that the weakening of the magnetic field produced by the coil using the eddy currents can also be disregarded. The sheet metals maybe made from electric sheet metal or iron.

The magnet or magnets maybe embodied as permanent magnets. The advantage of this improvement is to be seen in that no current input is necessary for the magnet or magnets in order to create a magnetic field. At least one of the permanent magnets is embodiment as a side grounding magnet. The advantage of this improvement is to be seen in that side grounding magnets create a strong magnetic field per magnet volume, therefore, have a high energy density.

The invention also provides that the magnet or magnets are embodied as electromagnets. The advantages of this improvement is to be seen in that particularly strong magnetic fields can be created with the aid of electromagnets.

The core, around which the coil is wound, is embodied as a double T-shaped core whose longitudinal axis is positioned in the longitudinal direction of the coil. The advantage of this improvement is to be seen in that such a double-T-shaped core can be produced in a particularly simple manner. In particularly, it is easily possible to create, in particular, such a core from ferromagnetic sheet metals with a high permeability that are separated from one another by insulating layers.

The invention also provides for an actuator including a ferromagnetic jacket. At least one magnet is embedded in the jacket and includes a length, a first end, and a second end. Each of the first and second ends of the magnet include a surface which is at least partially covered by the jacket. A ferromagnetic core comprises a length, a first collar-like protrusion, and a second collar-like protrusion. An electrically conductive coil through which an electrical current may flow is mounted to the core. The coil comprises a length. The coil is arranged adjacent the magnet and separated from the magnet by a gap. The length of the magnet is greater than the length of the coil. At least one of the coil and the magnet is movably mounted. At least one of the coil and the magnet is statically mounted. One of the coil and the magnet is capable of vibrating while the other of the coil and the magnet remains static.

The gap may comprise an air gap. The at least one magnet may have a predetermined direction of magnetization and the coil may be arranged in an offset position in a direction of magnetization of the magnet. The first and second ends of the magnet may be adapted to protrude beyond the first and second ends of the coil. The ferromagnetic core may be of high permeability and the coil may be wound around the core and between the first and second collar-like protrusions, each collar-like protrusion being made of high-permeability ferromagnetic material. The ferromagnetic jacket may be of high permeability and cover entirely the surfaces of the first and second ends of the magnet. One of the magnet and the coil may be statically mounted while the other of the magnet and the coil may be mounted via at least one spring. The coil may comprise a longitudinal axis which is oriented essentially vertically to a direction of magnetization of the magnet. The magnet may be ring-shaped and magnetized in the radial direction. The electrically conductive coil may comprise a longitudinal axis which is arranged vertically to the radial direction of magnetization of the magnet, the coil being concentrically surrounded by the magnet in such a way that an air gap remains between the magnet and the coil.

The magnet may comprise two magnets. Each of the two magnets may comprise essentially cuboid magnets arranged at a distance from one another whose surface normals point in a positive and negative "y" direction, with a magnetization of one magnet pointing in the positive "y" direction and the magnetization of the other magnet pointing in the negative "y" direction. Each of the two magnets may be embedded in a ferromagnetic jacket of high permeability that covers, at least partially, a surface of each of the first and second end of the magnet, each surface of the magnet having a surface normal which points in a positive and/or negative "z" direction. The electrically conductive coil may comprise a longitudinal axis arranged along the "z" direction and wherein the coil is arranged between the two magnets in such a way that an air gap remains between the coil and each of the two magnets.

The actuator may further comprise one of a controllable resistor and a controllable source connected to the coil. The coil may be adapted to be short-circuited by a controllable electric consumer. The controllable electric consumer may comprise a controllable electric resistor. The magnet may be statically mounted and the coil may be spring mounted via at least one elastomer bearing. The jacket may be statically mounted and the core may be spring mounted via at least one elastomer bearing. The coil may be statically mounted and the magnet may be spring mounted via at least one elastomer bearing. The core may be statically mounted and the jacket may be spring mounted via at least one elastomer bearing. One of the magnet and the coil may be spring mounted via at least one of a spiral chain, a coil spring, and a leaf spring. One of the jacket and the core may be spring mounted via at least one of a spiral chain, a coil spring, and a leaf spring.

The actuator may further comprise at least one leaf spring arranged adjacent at least one of the first and second collar-like protrusions. The at least one leaf spring may have one end mechanically connected to the core and another end firmly fixed to a housing via a static bearing. The at least one leaf spring may have a middle portion which is mechanically connected to the core and at least one end connected to a housing. The at least one end may be connected to the housing via one of a static bearing, moving bearing, and a floating bearing. The at least one leaf spring may comprise at least two leaf spring arranged adjacent one another.

The actuator may further comprise at least one leaf spring system coupled to one of the coil and the magnet. The actuator may further comprise at least one leaf spring system coupled to one of the core and the jacket. The leaf spring system may comprise at least two leaf springs connected to one another and forming a mechanical working connection, and wherein the mechanical working connection connects the core to a housing. The leaf spring system may comprise at least two leaf springs connected to one another and forming a mechanical working connection, and the mechanical working connection may connect the jacket to a housing. At least one leaf spring may be connected in an electrically conductive manner to the coil and wherein the leaf spring is connected in an electrically conductive manner to a power source. The core and coil may be statically mounted and the jacket and magnet may be mounted with the aid of at least one leaf springs.

The actuator may further comprise at least one leaf spring coupled to a first collar-like protrusion and at least one leaf spring coupled to a second collar-like protrusion. The at least one magnet may comprise two magnets and may further comprise at least one leaf spring coupled to one magnet and at least one leaf spring coupled to the other magnet. The middle portion of at least one of the leaf springs may be coupled to at least one of the magnets. The ferromagnetic core and the ferromagnetic jacket may comprise a plurality of ferromagnetic sheets with high permeability, the sheets being separated from one another by insulating layers. The sheets may comprise electrical sheets. The magnet may comprise a permanent magnet. The permanent magnet may comprise a rare earth magnet. The magnet may comprise an electromagnet. The core may comprise a double T-shaped core.

The invention also provides for an actuator comprising a jacket. At least one magnet is attached to the jacket and comprises a length, a first end, and a second end. Each of the first and second ends of the magnet comprise a surface which is at least partially covered by the jacket. A core comprises a length. An electrically conductive coil through which an electrical current may flow is mounted to the core. The coil comprises a length and surrounds the core. The coil is arranged adjacent the magnet and is separated from the magnet by a gap. A distance between the surface of the first end of the magnet and the surface of the second end of the magnet may be greater than the length of the coil. At least one of the coil and the magnet is mounted to vibrate. At least one of the coil and the magnet is statically mounted. One of the coil and the magnet is capable of vibrating while the other of the coil and the magnet remains static.

BRIEF DESCRIPTION OF THE DRAWINGS

An exemplary embodiment and other advantages of the invention shall be described in connection with the following figures, which show.

DETAILED DESCRIPTION OF THE INVENTION

Figure 1:
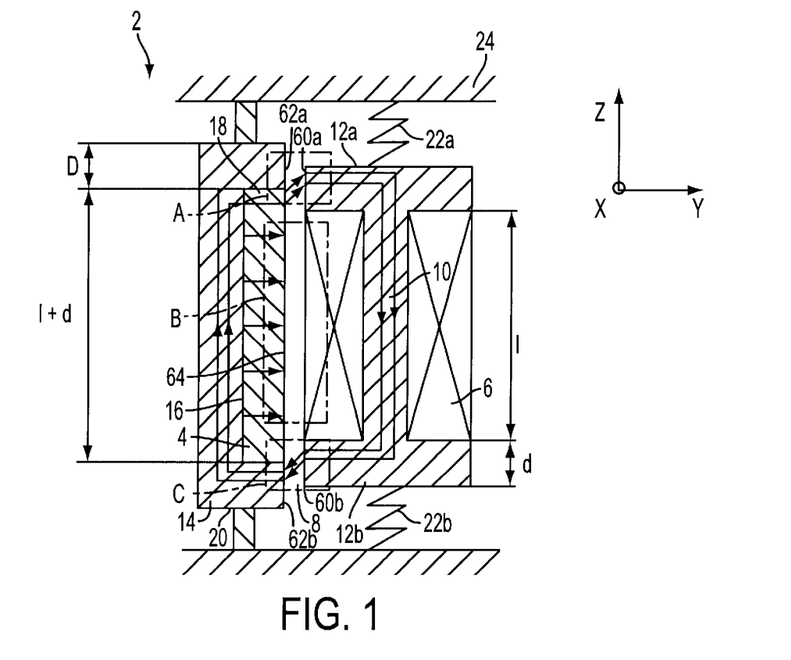
FIG. 1 shows an actuator in longitudinal section.

FIG. 1 depicts an actuator 2 in longitudinal section. The actuator 2 contains a magnet 4 that is provided with a predetermined magnetization that points to the positive "y" direction. Further, the actuator 2 contains an electrically conductive coil 6 whose longitudinal axis is oriented in the "z" direction and is thus positioned largely perpendicular to the direction of the magnetization of the magnet 4. The coil 6 is wound around a ferromagnetic core 10 of high permeability which, viewed in the longitudinal direction of the coil (i.e., "z" direction), ends above and below the coil in collar-like protrusions 12a and 12b made from ferromagnetic material with high permeability. The coil 6 is positioned in relation to the magnet 4 such that a small air gap 8 remains between the above-mentioned components of the actuator 2. In the exemplary embodiment according to FIG. 1, the magnet 4 protrudes in its static state beyond the coil 6 both at the upper end as well as at the lower end, viewed in the longitudinal direction of the coil 6. This also applies to all other magnets of the other exemplary embodiments that are described later.

The magnet 4 is embedded into a ferromagnetic jacket 14 of high permeability that covers at least partially, preferably the entire surface 16 of the magnet 4 pointing away from the coil 6 and the upper surface 18 and the lower surface 20 of the magnet, viewed in the longitudinal direction of the coil. In the exemplary embodiment shown and all further depicted exemplary embodiments, the ferromagnetic jacket 14 is preferably embodied such that the side faces 62a, 62b of the jacket 14 transform immediately (without a break) into the side faces 64 of the magnet 4. In the exemplary embodiments shown, the coil 6, including the core 10, is positioned in a springed manner with the aid of coil springs 22a and 22b in the housing of the actuator 2, with the magnet 4 embedded in the jacket 14, however, being statically positioned in the housing 24.

In the exemplary embodiment shown in FIG. 1, the collar-like protrusions 12a and 12b are formed such that, between their side faces 60a, 60b and the side faces 62a, 62b of the ferromagnetic jacket 14 positioned opposite, a small air gap remains with a width of preferably about 0.2 mm to 5 mm. Due to this narrow air gap, only a small loss of magnetic field occurs when the magnetic flux flows from the collar-like protrusion 12a, 12 into the ferromagnetic jacket and back. The coil 6 is preferably wound onto the core 10 such that an air gap remains between the coil 6 and the magnet 4 that has approximately the same width as the air gap between the mentioned face areas 60a, 60b, and 62a, 62b. In all other exemplary embodiments of the invention, the collar-like protrusions 12a, 12b are also formed such that only a narrow air gap remains between their side faces and the surfaces at the side of the jacket 14 positioned opposite. Additionally, the coil 6 is wound onto the core 10 as described above.

The ferromagnetic jacket 14 and, in particular, the parts of the ferromagnetic jacket 14 that cover the upper surface 18 or the lower surface 20 of the magnet 4 are provided with a thickness D. The collar-like protrusions 12a, 12b of the core preferably have a thickness "d" that is less than or equal to the thickness D of the ferromagnetic jacket 14. In the longitudinal direction of the coil (i.e., in the z direction), the jacket 14 has a length of approximately L=l+d, which corresponds to the length "l" of the coil added to the thickness d of the collar-like protrusions 12a, 12b. The coil 6 and the magnet 4 are positioned in relation to one another such that in the static state of the actuator 2, the magnet 4 protrudes beyond the upper or the lower end of the coil 6 each by the length d/2, viewed in the longitudinal direction of the coil. The above-mentioned dimensions apply to the actuators 2 of all other exemplary embodiments as well.

In the following, it shall be described how the actuator 2 behaves when an alternating current is driven through the coil 6. Here, it is initially supposed that the current flow through the coil 6 is oriented such that it flows on the left side of the core 10 into the paper level and flows on the right side of the core 10 out of the paper level. In this case, a magnetic field is created by the current flow in the coil 6 whose magnetic field lines inside the core 10 run in the negative "z" direction. The magnetic flux is guided through the collar-like protrusions 12a, 12b and through the jacket 14 in which the magnet 4 is embedded. The magnetic field lines have the orientation depicted in FIG. 1. Due to the magnetic field created by the coil 6, different forces are created in the actuator 2. In the region A, a force develops in the negative "z" direction that acts on the core 10 and the coil 6. This magnetic reluctance force develops from the magnetic field lines of the magnetic field that is created by the coil 6 having current flow therethrough and having the urge in the region A to permeate the magnet 4 or to close over the magnet 4 since, in the region A, the magnetic field lines created by the magnet 4 have the same direction as the magnetic field lines created by the electric current flowing through the coil 6.

In the region B, a Lorentz force directed in the negative "z" direction acts on the coil 6 since the vector of the current flowing through the coil 6 points in the negative "x" direction and the magnetic field created by the magnet 4 points in the positive "y" direction and thus the cross product of these two vectors points in the negative "z" direction.

In the region C, a force pointed in the negative "z" direction acts on the core 10 and the coil 6 since, in this region, the magnetic field lines created by the coil 6 have an opposite direction to the magnetic field lines created by the magnet 4. Therefore, the magnetic field lines attempt to remove each other in this area, which causes the coil 6 to deflect downwards.

All three forces acting onto the coil 6 in the negative "z" direction add up to a total force pointing in the negative "z" direction that causes the coil to move downward. When the current flows through the coil in the other direction, a total force is exerted on the coil oriented accordingly in the positive "z" direction and thus the coil 6 moves in the positive "z" direction, i.e., upwards. When an alternating current is driven through the coil 6, a periodic exciter force acts onto the coil 6 which excites the mass-spring system that includes the coil 6, the core 10, and the coil springs 22a and 22b.

The oscillating mass-spring system (i.e., the coil 6 with the core 10 in the exemplary embodiment according to FIG. 1) is preferably positioned in relation to the static mass (i.e., opposite to the magnet 4 with the jacket 14 in the exemplary embodiment according to FIG. 1) such that, originating from its resting position (see FIG. 1), it can be deflected upward or downward (viewed in the "z" direction) by the maximum distance d/2; the entire oscillation path from one maximum deflection to the other maximum deflection therefore corresponds to the thickness "d" of the collar-like protrusions 12a, 12b. It has been observed that the actuator 2 has a linear behavior in this range and can therefore easily be controlled or regulated. The deflection can, e.g., be limited by a corresponding stiffness of the springed positioning (by an appropriate stiffness of the coil springs 22a, 22b in the exemplary embodiment according to FIG. 1). All actuators 2 in all other exemplary embodiments are preferably positioned in this manner.

It should be explicitly stressed at this point that the function of the actuator 2 depicted in FIG. 1 is not dependent on the magnetic field of the magnet 4 being oriented in the positive "y" direction or in the negative "y" direction. When the magnetic field of the magnet 4 is oriented in the negative "y" direction it only reverses the direction of the forces acting onto the coil 6 in a predetermined current flow direction through the coil. At this point it should also be expressly pointed out that the function of the actuator 2 depicted in FIG. 1 is not dependent on the coil 6 or the magnet 4 being positioned in a springed manner. If the magnet 4 instead of the coil 6 is positioned in a springed manner, the magnet 4 moves upwards when the coil 6 positioned in a springed manner would move downward in a corresponding current direction and vice versa. Such a kinematic reversion is also possible in all other depicted exemplary embodiments.

Figure 2A:
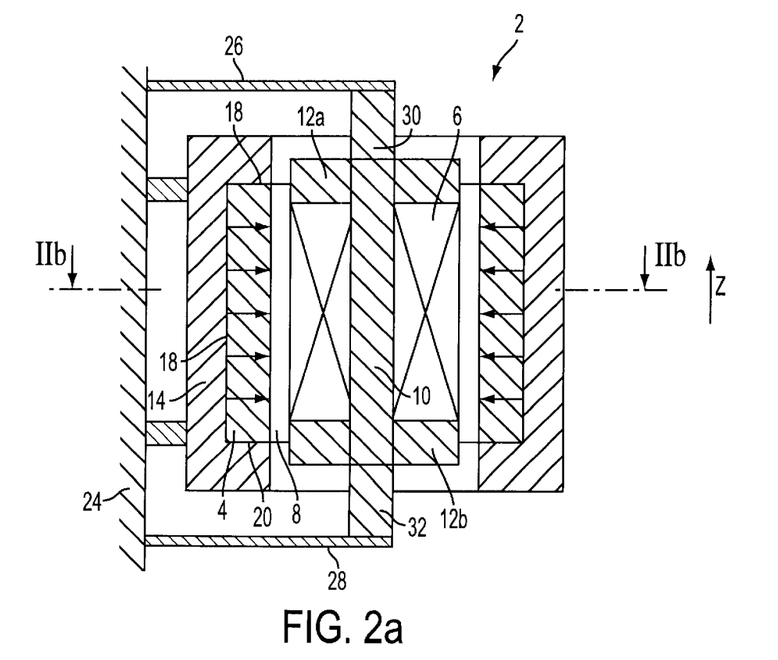
FIG. 2a shows an actuator in longitudinal section.
Figure 2B:
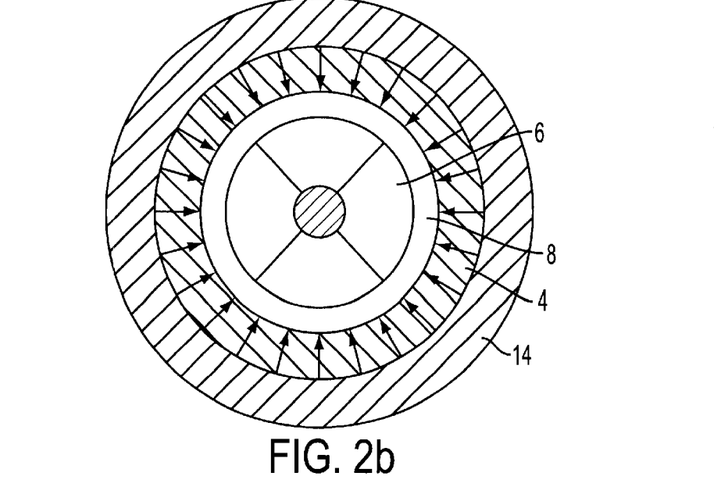
FIG. 2b shows an actuator in cross section.

FIG. 2 depicts an actuator 2 with FIG. 2a showing a longitudinal section of the actuator 2 and FIG. 2b showing a cross section along the line depicted in FIG. 2a. The actuator 2 is provided with a ring-shaped magnet 4 according to FIG. 2, whose magnetization points in the radially internal direction. The longitudinal axis of the electrically conductive coil 6 is positioned perpendicular to the radical direction of the magnetization of the magnet 4, i.e., it is oriented in the "z" direction. The coil 6 is concentrically encircled by the ring-shaped magnet 4 such that an air gap 8 remains between the coil 6 and the ring-shaped magnet 4. Additionally, the actuator 2 depicted in FIG. 2 is provided with a similar design as the actuator 2 shown in FIG. 1, i.e., the coil 6 is wound onto a core 10 with collar-like protrusions 12a and 12b and the ring-shaped magnet 4 is embedded into a jacket 14 that covers the surface 16 of the magnets opposite of the coil and the upper surface 18 and the lower surface 20 of the magnet, viewed in the longitudinal direction of the coil. The core 10 with its collar-like protrusions 12a, 12b is provided in the form of a dumbbell or a cable drum onto which the coil 6 is wound.

The operational principle of the actuator 2 depicted in FIG. 2 is identical to the operational principle of the actuator 2 depicted in FIG. 1, so it need not be discussed again at this point. In the actuator 2 depicted in FIG. 2, like in the actuator 2 depicted in FIG. 1, the coil 6 wound onto the core 10 is positioned in a springed manner with the aid of leaf springs 26 and 28 with the leaf spring 26, viewed in the longitudinal direction of the coil 6, being positioned above the core 10 and the leaf spring 28, viewed in the longitudinal direction of the coil 6, being positioned below the core 10. One end each of the leaf springs 26 or 28 is mechanically connected by a distance maintainer 30 and/or 32 with the collar-like protrusion 12a or 12b of the core 10. Here, the distance maintainer 30 and/or 32 are preferably positioned such that their central longitudinal axes correlate with the extended axis of the coil as depicted in FIG. 2 (the same also applies to the distance maintainers depicted in the following exemplary embodiments that have a mechanical connection with the collar-like protrusions of the core in a mechanical connection). The other end of the leaf spring 26 or the leaf spring 28 is respectively clamped in the housing 24 to which the ring-shaped magnet 4 is fastened as well.

For the operation of the actuator 2 depicted in FIG. 2, it is irrelevant if the magnetic field created by the ring-shaped member 4 points into the radial internal direction (i.e., toward the coil) or into the radially external direction (i.e., away from the coil).

Figure 3A:
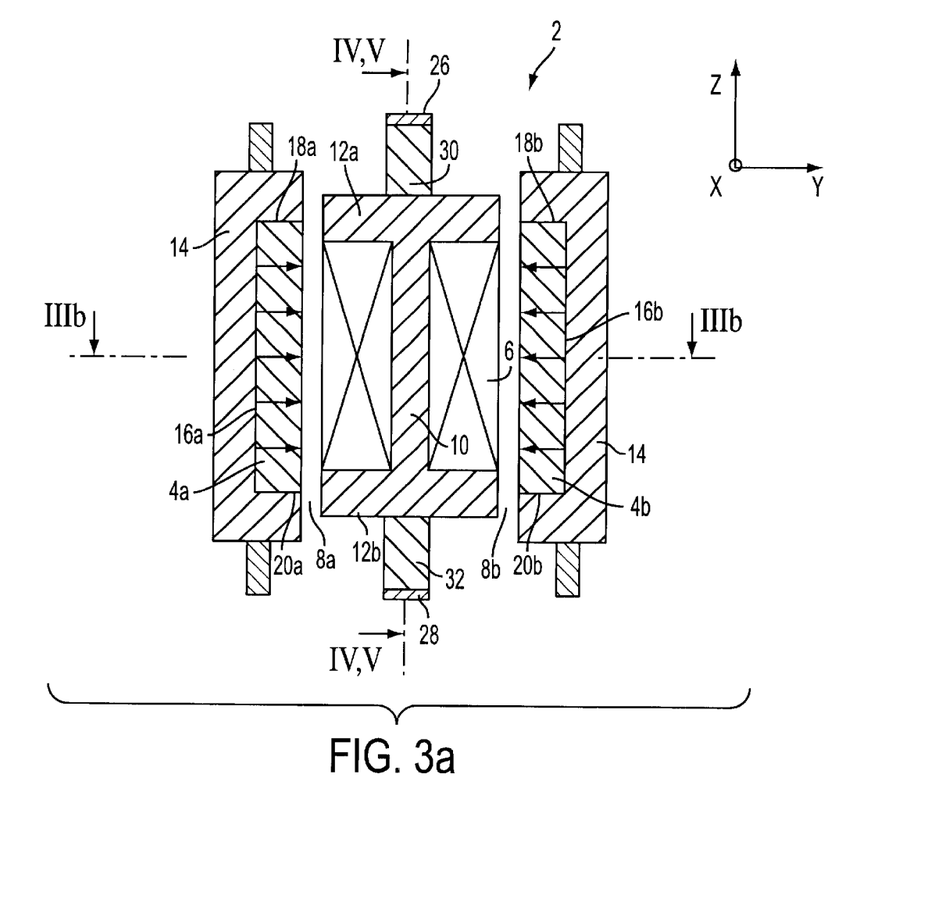
FIG. 3a shows an actuator in longitudinal section.
Figure 3B:
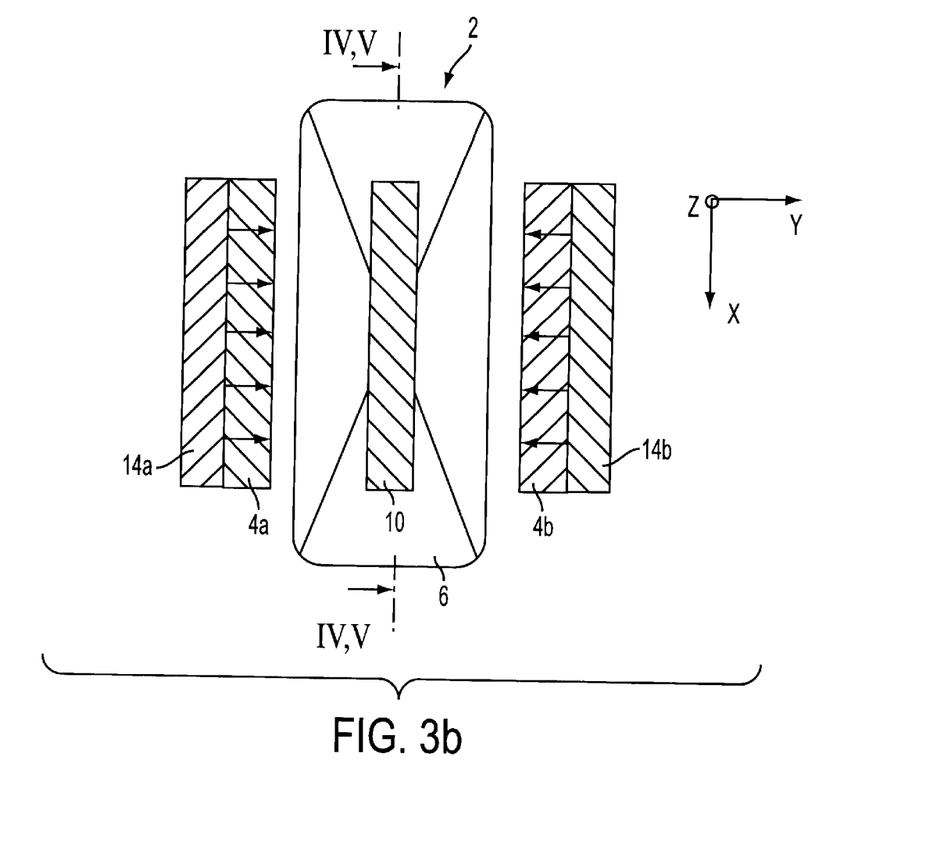
FIG. 3b shows an actuator in cross section.

FIG. 3a and FIG. 3b depict an actuator 2 with two cuboid magnets 4a, and 4b largely separated from each other with facial areas that are provided with surface normals pointing in the positive or negative "y" direction. The magnetization of the magnet 4a points in the position "y" direction; however, the magnetization of the magnet 4b points into the negative y direction. Between the two cuboid magnets 4a and 4b, an electrically conductive coil is centrally positioned whose longitudinal axis is oriented in the "z" direction. Between the magnets 4a and 4b and the coil 6, an air gap 8a or 8b each of equal width remains. The coil 6 is wound around a double-T shaped core 10 that ends in collar-like protrusions 12a and 12b above and below the coil, viewed in the longitudinal direction of the coil 6 (i.e., in the "z" direction). In the actuator 2 depicted in FIGS. 3a and 3b, each of the magnets 4a and 4b is also embedded in a ferromagnetic jacket 14 of high permeability that respectively covers the surface 16a or 16b facing away from the coil 6 and the upper area 18a, 18b and the lower area 20a, 20b or the magnet, viewed in the longitudinal direction of the coil 6.

In the actuator depicted in FIGS. 3a and 3b the coil 6 wound around the core 10 is positioned in a springed manner with the aid of leaf springs 26 and 28; however, the magnets 4a and 4b, having a jacket, are positioned statically. The leaf springs 26 and 28 are each positioned above or below the core 10, viewed in the longitudinal direction of the coil, and are mechanically connected to the core 10 via distance maintainers 30 and 32.

Figure 4:
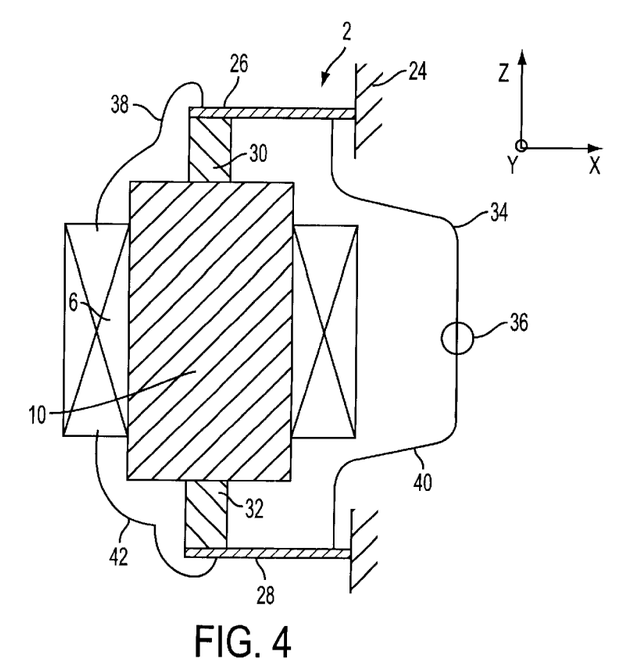
FIG. 4 shows an actuator in longitudinal section.

In FIG. 4, which depicts a longitudinal section along the line IV/IV through the actuator 2 shown in FIG. 3a, an exemplary embodiment can be seen of how the leaf springs 26 and 28 can be fastened onto the actuator 2 or the housing 24 of the actuator 2. One end of the leaf spring 26 or the leaf spring 28 is fastened on the distance maintainer 30 or 32 that is mechanically connected to the core 10 around which the coil 6 is wound. The other end of the leaf spring 26 or the leaf spring 28 is tightly clamped into the housing 24. Here, the leaf springs 26 and 28 are preferably oriented such that their longitudinal axes run along the "x" direction. The use of such a direction of the leaf spring 26 and 28 is logical when FIG. 3a is observed. When an alternating current is driven through the coil 6, the coil 6 begins to oscillate in the "z" direction. Thus, the leaf springs 26 and 28 are bent accordingly so that the coil 6 wound around the core 10 moves in one oscillation process in a slightly bent circular section. However, since this circular section is positioned only in the "x-z" plane, it is ensured by the orientation of the longitudinal direction of the leaf springs 26 and 28 in the "x" direction that the coil 6 wound around the bore 10 approaches neither the magnet 4a nor the magnet 4b during an oscillation process (which obviously would be the case if the longitudinal direction of the leaf springs 26 or 28 were oriented in the "y" direction). Therefore, by the preferred orientation of the longitudinal direction of the leaf springs 26 and 28 in the "x" direction, it can be assured that, in an oscillation process of the coil, the air gap 8a and 8b always has the same width and thus there is no danger of the coil 6 coming into contact with the magnet 4a or 4b.

In addition to the above-mentioned description, a particularly advantageous current introduction to the electrically conductive coil 6 can be discerned from FIG. 4. Here, a wire 34 leads from the voltage source 36 to the end of the leaf spring 26 facing the housing 24. Another wire 38 leads from the other end of the leaf spring 26 which is in effective connection with the distance maintainer 30 to an electrically conductive coil 6. Accordingly, wires 40 and 42 lead from the voltage source 36 via the leaf spring 28 to the electrically conductive coil 6 so that the electrical circuit is closed by the coil. When the coil 6 wound around the core 10 begins to oscillate in the "z" direction due to the current flow through the coil 6, the end points of the wires 34 and 40 which end on the leaf springs 26 or 28 are dynamically stressed only negligibly since the areas of the leaf springs 26 or 28 in which the wires 34 and 40 end are practically not deformed during the oscillation of the coil 6. Additionally, the wires 38 and 42 that lead from the leaf springs 26 and 28 to the coil 6 are dynamically not stressed since the two end points of the wires always take a position of equal distance from one another during an oscillation of the coil in the "z" direction. The current introduction into the electrically conductive coil 6 described in connection with FIG. 4 can be used as every point in which the coil 6 positioned in a springed manner is connected via leaf springs 26, 28 to the housing and certainly works only when the leaf springs 26, 28 are electrically conductive and are electrically insulated from the housing 24 and the distance maintainer 30 and 32. Certainly, a current introduction is also possible by all other springs depicted in the exemplary embodiments, as long as they are electrically conductive.

Figure 5:
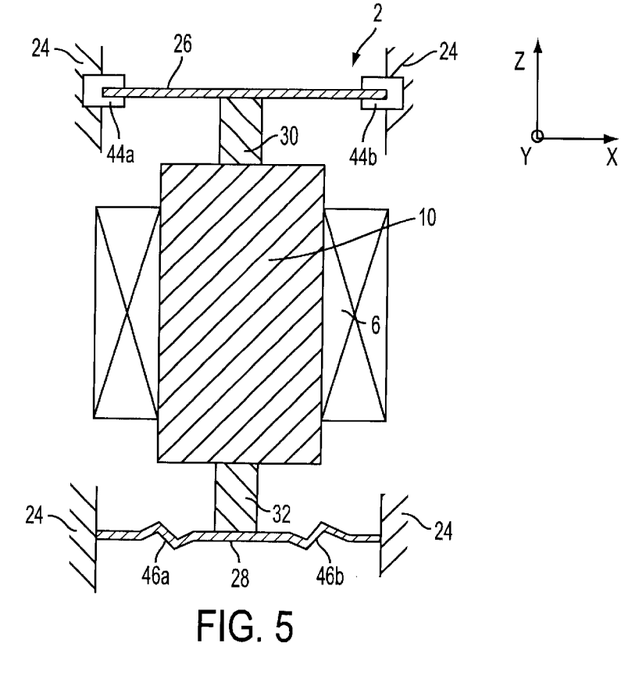
FIG. 5 shows an actuator in longitudinal section.

FIG. 5 depicts an alternative exemplary embodiment of the bearing of the coil 6 that is wound around the core 10 of the actuator 2 depicted in FIG. 3. Viewed in the longitudinal direction of the coil 6, leaf springs 26 and 28 are provided above and below the core 10. However, in this exemplary embodiment, the leaf springs 26 and 28 are mechanically connected in their central axes to the distance maintainer 30 or 32 fastened to the core 10 and are each clamped at their ends in the housing 24 of the actuator 2. The part of the leaf springs 26 or 28 that is positioned between the ends of the leaf springs 26 or 28 and the distance maintainer 30 or 32 is formed such that it can stretch in the longitudinal direction of the leaf spring (i.e., in the "x" direction). This is achieved in the leaf spring 26 in that the leaf spring 26 is clamped at both ends of the housing 24 via a moving bearing 44a or 44b. The movable bearing 44a, 44b can be an elastic, stretchable rubber bearing, for instance. This is achieved in the leaf spring 28 such that, in the areas mentioned, it is provided with a fold 46a or 46b which allows a stretching of the leaf spring 28 in the "x" direction when appropriate forces act upon the leaf string 28 as well.

The advantage of the bearing of the coil 6 wound around the core 10 depicted in FIG. 5 is to be seen in that, in an oscillation of the coil 6 in the "z" direction, no resulting torsion momentum is created.

Figure 6:
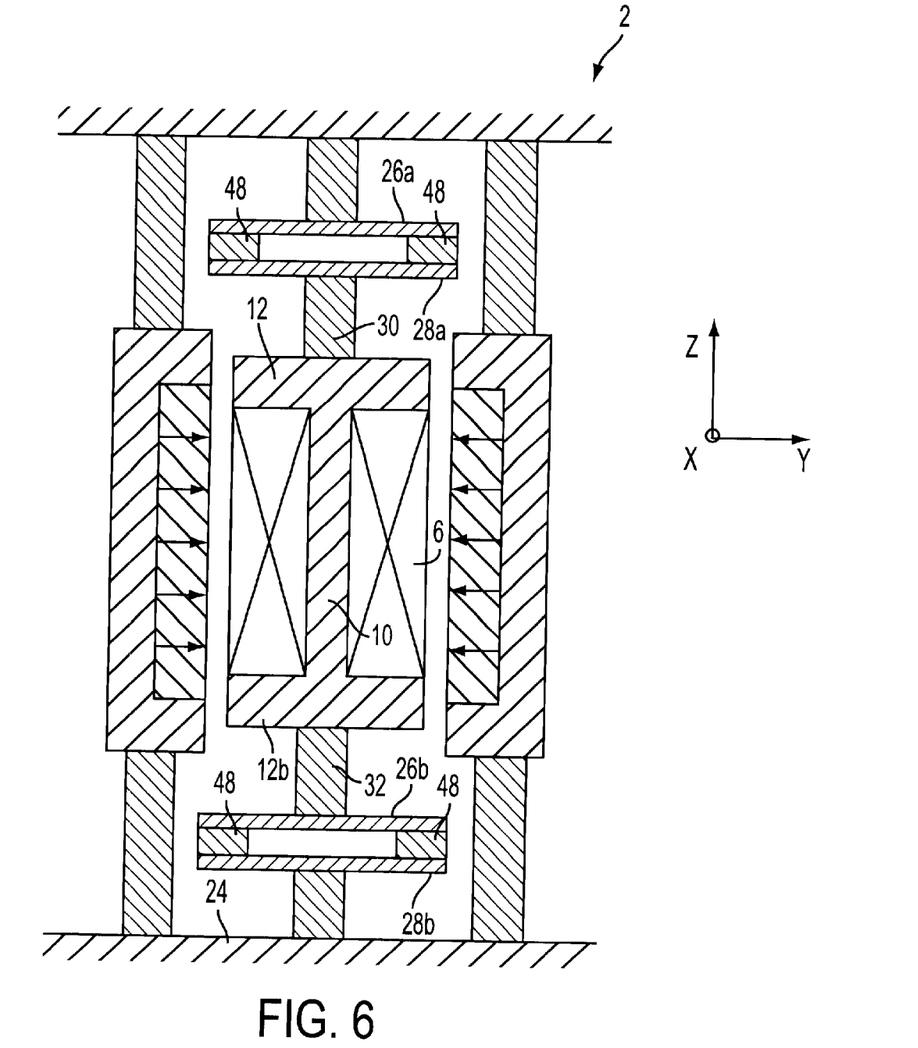
FIG. 6 shows an actuator in longitudinal section.

FIG. 6 depicts an actuator 2 that is largely constructed identically to the actuator 2 depicted in FIG. 2 with a ring-shaped magnet 4 or constructed largely identically to the actuator 2 depicted in FIG. 3 with two cuboid magnets 4a and 4b. The actuator 2 depicted in FIG. 6 varies only by the springed bearing of the coil 6 wound around the core 10. In the center of the protrusions 12a and 12b are distance maintainers 30 and 32 whose other end is respectively mechanically connected to the housing 24 of the actuator 2. Each of the two distance maintainers 30 and 32 is interrupted by a leaf spring system of two leaf springs 26a, 28a or 26b, 28b positioned above each other. The two leaf springs 26a–26b and 28a–28b are separated from one another at their ends by a distance maintainer 48 and connected to one another through it. Additionally, the upper leaf spring 26a, 28a is connected in its central area to the part of the appropriate distance maintainer facing the housing 24; however, the lower leaf spring 26b, 28b is connected in its central area to the part of the distance maintainer facing the core 10. The leaf springs 26a, 26b, and 28a, 28b are oriented such that the longitudinal direction of the leaf springs runs perpendicular to the longitudinal direction of the coil 6 or perpendicular to the oscillation direction of the coil 6.

When an alternating current is driven through the coil 6 and thus the coil 6 is excited to oscillate, the leaf springs 26a, 28a and 26b, 28b integrated into the distance maintainers 30 and 32 act similar to coil springs, but they have the advantage that they do not allow a shifting of the coil 6 wound around the core 10 in the perpendicular direction to the oscillation direction so that the width of the air gap 8 (see also FIG. 2) or the air gaps 8a, 8b (see also FIG. 3) remains constant. Additionally, the springed bearing shown in FIG. 6 of the coil 6 wound around the core 10 also has the advantage of no torsion momentum occurring during an oscillation of the coil 6 in the "z" direction.

Figure 7:
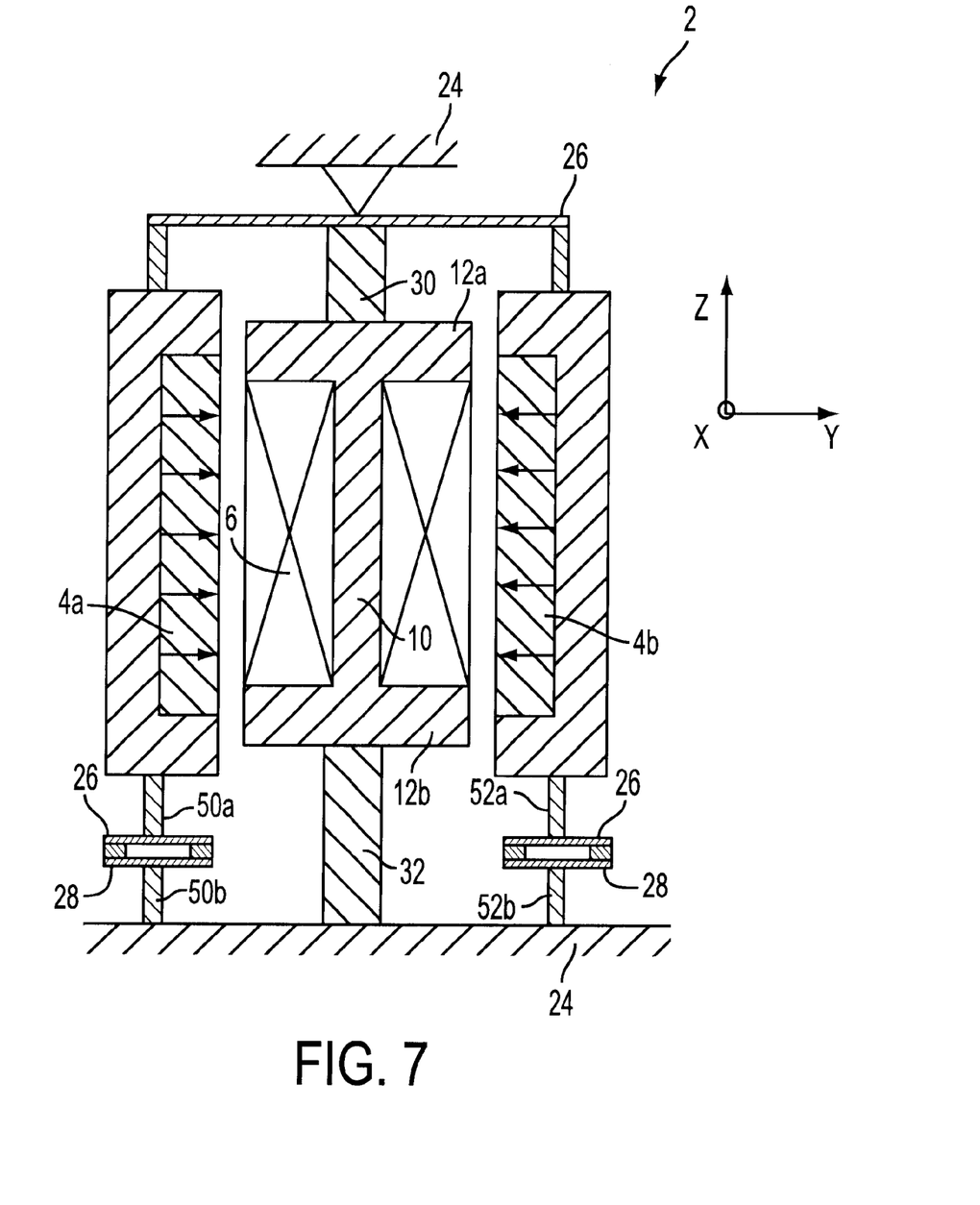
FIG. 7 shows an actuator in longitudinal section.

FIG. 7 also depicts the actuator 2, which is designed per se in the same manner as the actuator 2 containing a ring-shaped magnet 4 depicted in FIG. 2 or designed in the same manner as the actuator 2 containing two cuboid magnets 4a and 4b depicted in FIG. 3. The difference of the exemplary embodiment shown in FIG. 7 is to be seen in that the coil 6, including the core 10, is positioned statically and the embedded magnet 4 or the embedded magnets 4a and 4b are positioned in a springed manner such that they can perform oscillations in the "z" direction when an alternating current is driven through the coil 6. The springed positioning of the magnets 4a and 4b can occur with the aid of leaf springs, of which one each is provided above and below the magnets 4a, 4b, viewed in the longitudinal direction of the coil 6. In this case, each of the leaf springs 26 and 28 are mechanically connected in its central area to the magnet 4/jacket 14 via a distance maintainer 50a, 52a and at its ends with the wrapped magnets 4a or 4b via distance maintainers 50a, 52a, as it is also depicted for the leaf spring 26 in FIG. 7.

The coil wrapped around the core 10 can be mechanically connected directly to the housing 24 via a distance maintainer 32. In this case, each of the embedded magnets 4a and 4b can be positioned in a springed manner both above and below the core 10 with the aid of distance maintainers 50a–50b and 52a–52 b that are each interrupted by leaf springs 26 and 28 positioned above one another. The distance maintainers 50a–50b and 52a–52b have the same design as the distance maintainer 30 discussed in connection with FIG. 6 so that the design of the distance maintainer 50a–50b and 52a–52b is not discussed here again.

In all exemplary embodiments that are shown in FIGS. 1 through 7 the magnet 4 or the magnets 4a and 4b can be embodied as permanent magnets with an appropriate direction of magnetization or as electromagnets in which an appropriate direction of magnetization develops when it is flown through by a current. When in the actuators permanent magnets are used they are preferably embodied as side grounding magnets.

Additionally, in all exemplary embodiments shown in the figures, the ferromagnetic core 10 and the ferromagnetic jackets 14 can be made from ferromagnetic sheet metal with a high permeability, preferably from electric sheet metal or iron, which are separated from one another by insulating layers. Here, the metal sheets are stacked such that they can be flowed through particularly well by the magnetic flux that is created by the electrically conductive coil 6 and eddy currents can form only in the "thickness" of the sheets. This is described by way of example with reference to the actuator 2 shown in FIG. 3: the core 10 ending in the collar-like protrusions 12a and 12b consists of electric sheet metals or iron sheet metals, one of which is depicted in FIG. 3a. On this sheet metal lies an insulating layer onto which another sheet metal follows. This construction of the core 10 continues in the x direction so that the core 10 that is shown in FIG. 3 finally develops.

The jacket 14 may also be formed from "c-shaped" electric sheet metals/iron sheet metals, one of which is depicted in FIG. 3a. On top of the sheet metals shown in FIG. 3a lies an insulating layer that separates the sheet metals shown in FIG. 3a from the subsequent iron sheet metals. The design described is continued in the "x" direction so that finally the entire jacket 14 results for the magnets 4a and 4b.

Figure 8A:
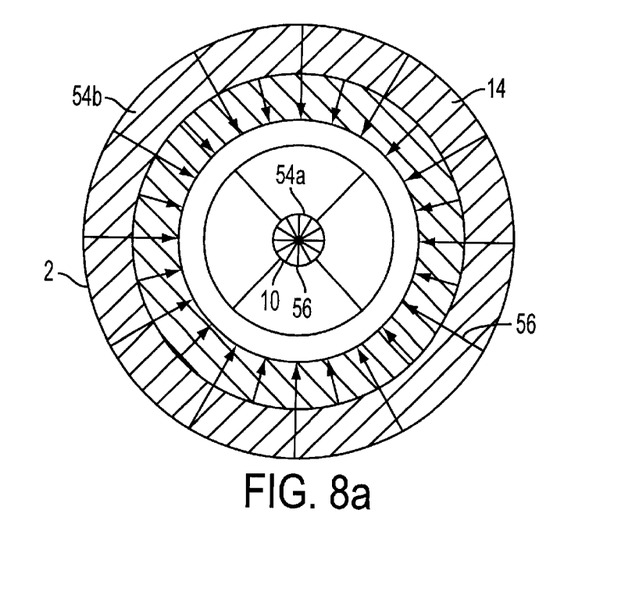
FIG. 8a shows an actuator in longitudinal section.

FIG. 8a depicts an actuator 2 which is designed identically to the actuator shown in FIG. 2a so that, with regard to its construction, reference is made to the corresponding description of the figure. Only one difference is to be seen in that, in the actuator 2 depicted in FIG. 8a, both the core 10 as well as the jacket 14 include separate electric sheet metals or iron sheet metals 54a or 54b positioned next to each other that are separated from one another by an insulating lacquer layer 56. The sheet metals 54a are provided with a cross section in the shape of a circular (pie-shaped) section and the sheet metals 54b in the shape of a ring section (a partially pie-shaped segment). The sheet metals 54a in the shape of a circular section and the sheet metals 54b in the shape of a ring section are positioned each that the insulating lacquer layers 56 are positioned on the exterior surfaces of the elements and two correlating elements are on the same radius.

Figure 8B:
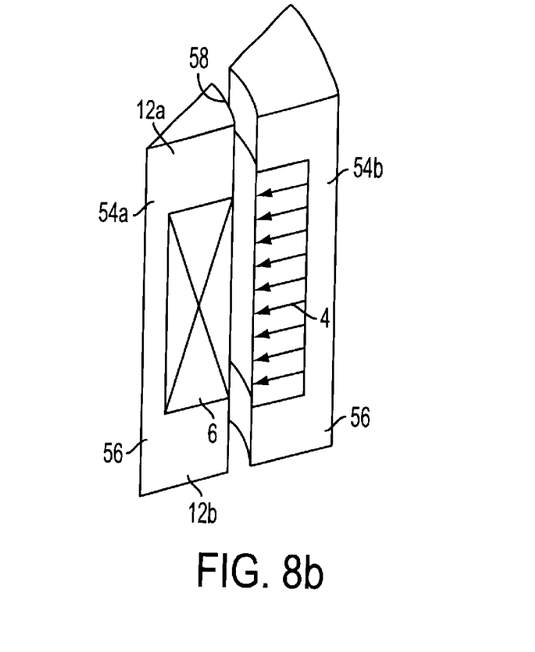
FIG. 8b shows a representation of a detail of an actuator viewed in perspective.

FIG. 8b shows a sheet metal 54a in the shape of a circular section with a correlating sheet metal 54b in the shape of a ring section in a perspective view. The sheet metal 54a in the shape of a circular section of the core 10 has, in the side view, the shape of a "c" which surrounds the coil 6. The sheet metal 54b in the shape of a ring segment has the shape of a "c" as well which surrounds the magnet 4. The "c"-shaped faces of the sheet metal 54a as well as of the sheet metal 54b are covered with an electrically insulating lacquer layer. The arch length 58 of the sheet metal 54a in the shape of a circular segment is formed to be as short as possible. In this case, the eddy currents forming in the sheet metal 54a can be disregarded. The same applies accordingly to the internal and external arch length of the sheet metal 54b in the shape of a ring segment.

Figure 9:
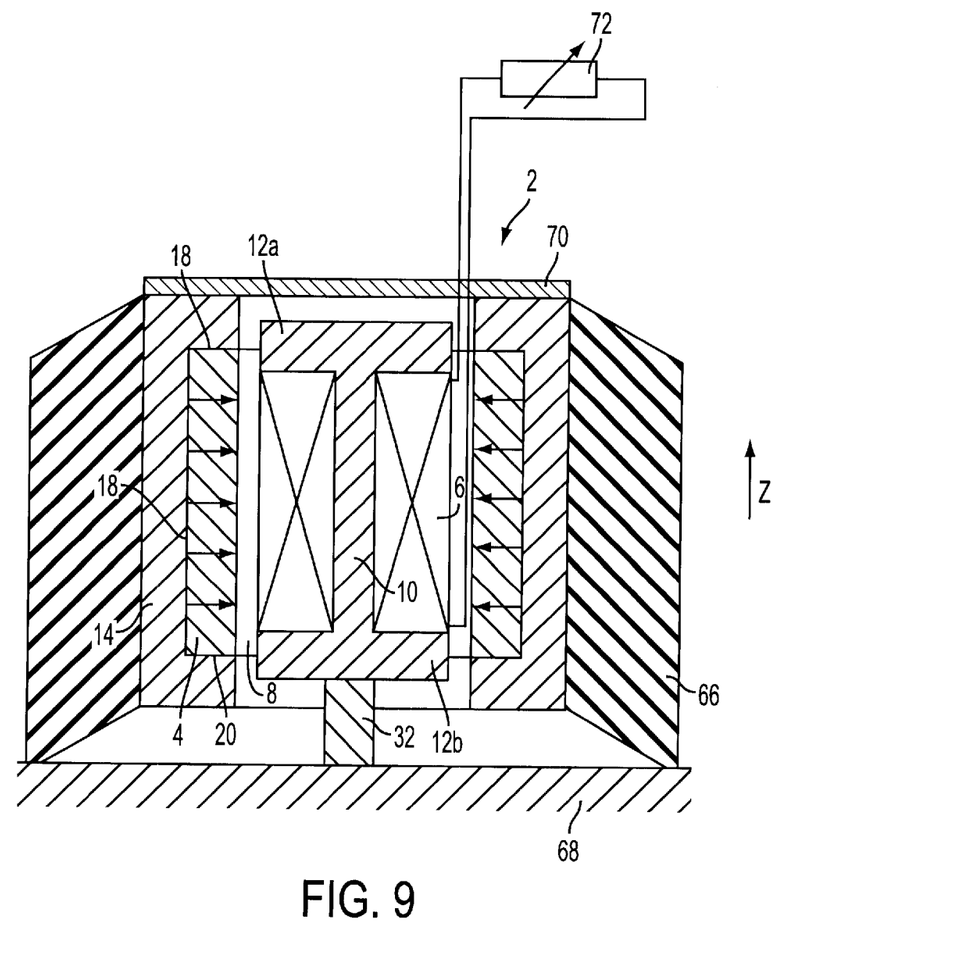
FIG. 9 shows an actuator in longitudinal section.

FIG. 9 depicts in the longitudinal direction an actuator 2 that is largely designed identically to the actuator depicted in FIG. 2 so that reference is made here to the description of that figure. The embedded ring-shaped magnet 4 of the actuator 2 is positioned in a springed manner with the aid of a spring element in the form of a ring-shaped elastomer bearing 66 in relation to a carrier plate 68. The elastomer bearing 66 thus encircles the jacket 14 on the radial outside and is formed such that a gap remains between the bottom of the jacket 14 and the carrier plate 68. The coil 6 wrapped around the core 10 is statically mounted on the carrier plate 68 with the aid of a distance maintainer 32. At the top of the jacket 14 a carrier plate 70 is mounted, sometimes with distance maintainers also being provided between the jacket 14 and the carrier plate, in order to enlarge the distance between the carrier plate and the core 10 and thus the "oscillation amplitude" in the "z" direction. The stiffness of the elastomer bearing 66 is chosen such that the actuator has the position depicted in FIG. 9 in which the magnet 4, viewed in the longitudinal direction of the coil 6, protrudes beyond the upper and lower ends of the carrier plate by the same length when the carrier plate is statically impacted by a known load, e.g., a motor (not shown).

The coil ends of the coil 6 are short-circuited by a controllable electric consumer in the form of a controllable electric resistor 72 or a controllable electric source. When the load supported at the carrier plate 70 is made to oscillate according to the "z" direction by exterior forces, these oscillations transfer onto the actuator 2 and the encircled magnet 4 positioned in a springed manner, begins to oscillate in the longitudinal direction of the coil. Thus, the magnetic field encircled by the coil 6 changes continually so that a voltage is induced in the coil 6 and, as a result, a current flows. The electrical energy of this current flux is transformed into heat in the resistor 72. Due to this energy change, the oscillation of the load is dampened. The greater the electrical resistor 72, the greater the dampening.

The coil ends of the coil 6 are short-circuited by a controllable electric consumer in the form of a controllable electric resistor 72 or a controllable electric source. When the load supported at the carrier plate 70 is made to oscillate according to the z direction by exterior forces these oscillations transfer onto the actuator 2 and the encircled magnet 4 positioned in a springed manner begins to oscillate in the longitudinal direction of the coil. Thus, the magnetic field encircled by the coil 6 changes continually so that a voltage is induced in the coil 6 and, as a result, a current flows. The electrical energy of this current flux is transformed into heat in the resistor 72. Due to this energy change, the oscillation of the load is dampened. The greater the electrical resistor 72, the greater the dampening.

List of Reference Characters 2 actuator
4 magnet
6 coil
8 air gap
10 core
12a, b collar-shaped protrusions
14 jacket
16 surface of the magnet facing away from the coil
18 upper surface of the magnet
20 lower surface of the magnet
22a, b coil springs
24 housing
26a, b leaf springs
28a, b leaf springs
30, 32 distance maintainers
34 wire
36 voltage source
38, 40, 42 wire
44a, b movable bearing
46 fault
48 distance maintainer
50a, b distance maintainer
52a, b distance maintainer
54a, b iron sheet metal
56 lacquer layers
58 arch length
60a, b faces on the side of the collar-shaped protrusions
62a, b faces on the side of the ferromagnetic jacket
64 face on the side of the magnet
66 elastomer bearing
68, 70 carrier plate
72 controllable electric resistor

What is claimed is:

1. An actuator comprising:
   a ferromagnetic jacket;
   at least one magnet embedded in the jacket and comprising a length, a first end, and a second end;
   each of the first and second ends of the magnet comprising a surface which is at least partially covered by the jacket;
   a ferromagnetic core comprising a length, a first collar-like protrusion, and a second collar-like protrusion,
   an electrically conductive coil through which an electrical current may flow mounted to the core;
   the coil comprising a length;
   the coil being arranged adjacent the magnet and separated from the magnet by a gap;
   the length of the magnet being greater than the length of the coil;
   at least one of the coil and the magnet being movably mounted;
   at least one of the coil and the magnet being statically mounted;
   wherein one of the coil and the magnet is capable of vibrating while the other of the coil and the magnet remains static.

2. The actuator of claim 1, wherein the gap comprises an air gap.

3. The actuator of claim 1, wherein the at least one magnet has a predetermined direction of magnetization and the coil is arranged in an offset position in a direction of magnetization of the magnet.

4. The actuator of claim 1, wherein the first and second ends of the magnet are adapted to protrude beyond the first and second ends of the coil.

5. The actuator of claim 1, wherein the ferromagnetic core is of high permeability and wherein the coil is wound around the core and between the first and second collar-like protrusions, each collar-like protrusions being made of high-permeability ferromagnetic material.

6. The actuator of claim 1, wherein the ferromagnetic jacket is of high permeability and covers entirely the surfaces of the first and second ends of the magnet.

7. The actuator of claim 1, wherein one of the magnet and the coil is statically mounted while the other of the magnet and the coil is mounted via at least one spring.

8. The actuator of claim 1, wherein the coil comprises a longitudinal axis which is oriented essentially vertically to a direction of magnetization of the magnet.

9. The actuator of claim 1, wherein the magnet is ring-shaped and is magnetized in the radial direction.

10. The actuator of claim 1, wherein the electrically conductive coil comprises a longitudinal axis which is arranged vertically to the radial direction of magnetization of the magnet, the coil being concentrically surrounded by the magnet in such a way that an air gap remains between the magnet and the coil.

11. The actuator of claim 1, wherein the at least one magnet comprises two magnets.

12. The actuator of claim 11, wherein each of the two magnets comprises essentially cuboid magnets arranged at a distance from one another whose surface normals point in a positive and negative "y" direction, with a magnetization of one magnet pointing in the positive "y" direction and the magnetization of the other magnet pointing in the negative "y" direction.

13. The actuator of claim 12, wherein each of the two magnets is embedded in a ferromagnetic jacket of high permeability that covers, at least partially, a surface of each of the first and second end of each magnet, each surface of each magnet having a surface normal which points in a positive and/or negative "z" direction.

14. The actuator of claim 13, wherein the electrically conductive coil comprises a longitudinal axis arranged along the "z" direction and wherein the coil is arranged between the two magnets in such a way that an air gap remains between the coil and each of the two magnets.

15. The actuator of claim 1, further comprising one of a controllable resistor and a controllable source connected to the coil.

16. The actuator of claim 1, wherein the coil is adapted to be short-circuited by a controllable electric consumer.

17. The actuator of claim 16, wherein the controllable electric consumer comprises a controllable electric resistor.

18. The actuator of claim 1, wherein the at least one magnet is statically mounted and the coil is spring mounted via at least one elastomer bearing.

19. The actuator of claim 1, wherein the jacket is statically mounted and the core is spring mounted via at least one elastomer bearing.

20. The actuator of claim 1, wherein the coil is statically mounted and the magnet is spring mounted via at least one elastomeric bearing.

21. The actuator of claim 1, wherein the core is statically mounted and the jacket is spring mounted via at least one elastomeric bearing.

22. The actuator of claim 1, wherein one of the at least one magnet and the coil is spring mounted via at least one of as spiral chain, a coil spring, and a leaf spring.

23. The actuator of claim 1, wherein one of the jacket and the core is spring mounted via at least one of a spiral chain, a coil spring, and a leaf spring.

24. The actuator of claim 1, further comprising at least one leaf spring arranged adjacent at least one of the first and second collar-like protrusions.

25. The actuator of claim 24, wherein the at least one leaf spring has one end mechanically connected to the core and another end firmly fixed to a housing via a static bearing.

26. The actuator of claim 24, wherein the at least one leaf spring has a middle portion which is mechanically connected to the core and at least one end connected to a housing.

27. The actuator of claim 26, wherein the at least one end is connected to the housing via one of a static bearing, moving bearing, and a floating bearing.

28. The actuator of claim 24, wherein the at least one leaf spring comprises at least two leaf springs arranged adjacent one another.

29. The actuator of claim 1, further comprising at least one leaf spring system coupled to one of the coil and the at least one magnet.

30. The actuator of claim 1, further comprising at least one leaf spring system coupled to one of the core and the jacket.

31. The actuator of claim 30, wherein the leaf spring system comprises at least two leaf springs connected to one another and forming a mechanical working connection, and wherein the mechanical working connection connects the core to a housing.

32. The actuator of claim 30, wherein the leaf spring comprises at least two leaf springs connected to one another and forming a mechanical working connection, and wherein the mechanical working connection connects the jacket to a housing.

33. The actuator of claim 30, wherein at least one leaf spring is connected in an electrically conductive manner to the coil and wherein the leaf spring is connected in an electrically conductive manner to a power source.

34. The actuator of claim 1, wherein the core and coil are statically mounted and the jacket and the at least one magnet are spring mounted with the aid of at least one leaf springs.

35. The actuator of claim 1, further comprising at least one leaf spring coupled to a first collar-like protrusion and at least one leaf spring coupled to a second collar-like protrusion.

36. The actuator of claim 1, wherein the at least one magnet comprises two magnets and further comprising at least one leaf spring coupled to one magnet and at least one leaf spring coupled to another magnet.

37. The actuator of claim 36, wherein a middle portion of at least one of the leaf springs is coupled to at least one of the magnets.

38. The actuator of claim 1, wherein the ferromagnetic core and the ferromagnetic jacket comprises a plurality of ferromagnetic sheets with high permeability, the sheets being separated from one another by insulating layers.

39. The actuator of claim 38, wherein the sheets comprise electrical sheets.

40. The actuator of claim 1, wherein the at least one magnet comprises a permanent magnet.

41. The actuator of claim 40, wherein the permanent magnet comprises a rare earth magnet.

42. The actuator of claim 1, wherein the at least one magnet comprises an electromagnet.

43. The actuator of claim 1, wherein the core comprises a double T-shaped core.

44. An actuator comprising:

a jacket;

at least one magnet attached to the jacket and comprising a length, a first end, and a second end;

each of the first and second ends of the at least one magnet comprising a surface which is at least partially covered by the jacket;

a core comprising a length and projecting portions;

an electrically conductive coil through which an electrical current may flow mounted to the core;

the coil comprising a length and ends which are at least partially covered by the projecting portions of the core, wherein the coil surrounds the core;

the coil being arranged adjacent the at least one magnet and separated from the at least one magnet by a gap;

a distance between the surface of the first end of the at least one magnet and the surface of the second end of the at least one magnet being greater than the length of the coil;

at least one of the coil and the at least one magnet being mounted to vibrate;

at least one of the coil and the at least one magnet being statically mounted;

wherein one of the coil and the at least one magnet are capable of vibrating while the other of the coil and the magnet remain static.

* * * * *